Figure 1:
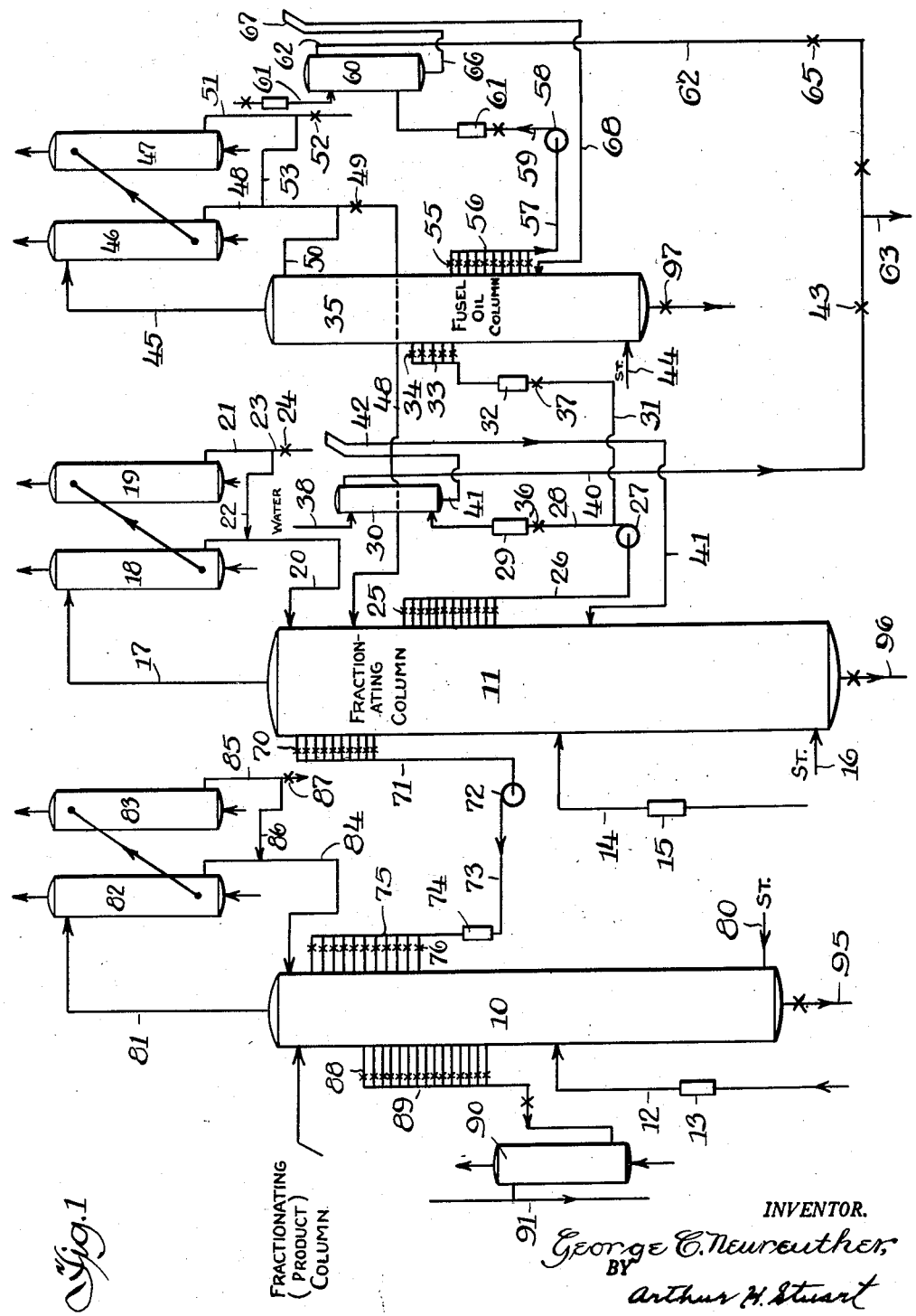

Jan. 13, 1959 G. C. NEUREUTHER 2,868,645
PROCESSES FOR PRODUCING DISTILLED POTABLE ALCOHOLIC LIQUORS
Filed Nov. 13, 1956 2 Sheets-Sheet 1

INVENTOR.
George C. Neureuther,
BY Arthur H. Stuart
Atty.

INVENTOR.
George C. Neureuther,
BY Arthur H. Stuart
Atty 682,645

United States Patent Office

Patented Jan. 13, 1959

2,868,645

PROCESSES FOR PRODUCING DISTILLED POTABLE ALCOHOLIC LIQUORS

George C. Neureuther, Morton, Ill., assignor to Hiram Walker & Sons, Inc., Peoria, Ill.

Application November 13, 1956, Serial No. 621,557

9 Claims. (Cl. 99—34)

The present invention relates to improvements in processes for producing distilled potable alcoholic liquors, such as whiskies, brandies and the like from fermented alcoholic stocks, such as beers and wines, and more particularly to such a process in which the quality and characteristics of the distilled product may be controlled within broad limits and in continuous operation to secure a uniform final product of the desired characteristics.

The type and general character of distilled liquors, to a large extent, are dependent upon the nature of the alcoholic fermented material from which they are produced. These may be beers, derived by fermentation of various grains or mixtures of grains, starchy materials such as potatoes and rice, or they may be fermented fruit juice products such as grape wine, or other fermented fruit juices. Since the present invention is applicable to the production of any of these distilled potable products, such as whiskies, brandies, vodka and the like, which in general have an alcohol proof of say, 80 to 160, the distilled products will hereinafter be generically designated as whiskies and the fermented liquids from which they are distilled as beers.

In the distillation of whiskies, a further control of the characteristics of the product, such as flavor, bouquet and body, is exercised by control of the extent to which the congeners produced along with the alcohol in the fermentation product are retained in the final product. Some of these congeners are more volatile than the alcohol and are commonly designated the heads or heads fractions. Others are less volatile than the alcohol and these include esters and also fusel oil and other high boiling fractions, known as tails. Some of these higher boiling constituents, such as the fusel oil fractions, may, to a certain extent at least, be carried off with the lighter or heads fractions and the alcohol by steam distillation when the distillation process is conducted under ordinary or atmospheric pressure conditions.

In the production of whiskies, it is desirable to retain in the final distillate product certain proportions of the congeners of the alcohol fermentation process, these proportions being controlled and maintained constant in order to secure uniformly a product having the desired characteristics of body, bouquet, flavor and composition. By operating in accordance with the present invention, after the desired characteristics have been established, this result may be secured with uniformity and constancy, and by the use of ordinary distillation equipment. In carrying out the process, the extent to which the desirable congeners of the alcoholic fermentation process are retained may be readily controlled by the operator.

Figure 2:
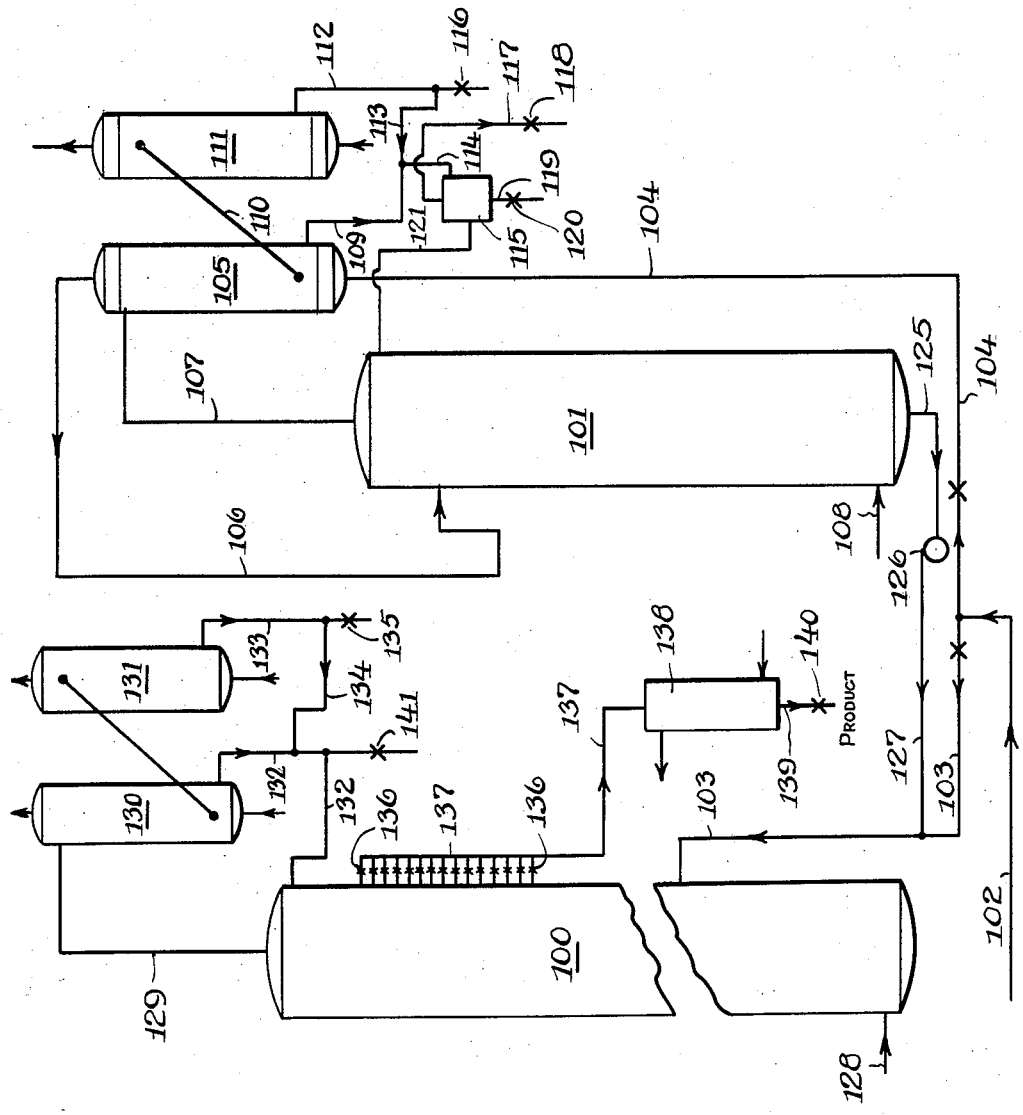

The invention will be fully understood from the following description and the accompanying drawings in which Fig. 1 shows in diagrammatic form an arrangement of apparatus suitable for carrying out the invention, and Fig. 2 shows, also in diagrammatic form, a modified arrangement of apparatus suitable for carrying out the invention.

Referring to Fig. 1 of the drawings, the numerals 10 and 11 indicate distilling columns of conventional character, provided internally with suitable fractionating plates, such as bubble plates, screen plates or the like. Beer or wine, that is, the fermented alcoholic liquid to be distilled, is supplied in part to each of these columns. For convenience, the distilling material will be generically referred to in the specification and appended claims as "beer." It is supplied to the column 10 at an intermediate point through the line 12 provided with a flow meter 13. It is supplied to the column 11 at an intermediate point through the line 14 provided with a flow meter 15. The beer may be preheated by heat exchange with higher temperature materials, such as the vapors from the fractionating columns, in the conventional manner.

Heat is supplied to the column 11 at its base by means of open or closed steam or a combination of both, this being introduced through line 16. The temperature at the base of the column may suitably be in the order of 215° to 220° F. Distillation of the beer takes place in the column 11 and as the vapors rise, they become richer in alcohol. The temperature at the top of the column is controlled so that the vapors leaving the column through line 17 contain from, say, 80 to 96% alcohol and preferably from 90 to 96% alcohol. These vapors pass successively through the condensers 18 and 19, which are of conventional type in which the vapors are cooled by water or by incoming beer in order to preheat the latter.

The condensate formed in the condenser 18 is returned through line 20 to the top of column 11 and serves as reflux therein. The condensate from condenser 19 passes out of the latter through the line 21. Any desired proportion of this condensate may be caused to pass through line 22 to join the condensate from condenser 18 in line 20 and to be returned with it to the top of column 11. That portion of the condensate from the condenser 19 not so returned passes out through the line 23 provided with valve 24. The condensate from condenser 19 contains the light volatile congeners or heads distilled from the column 11 with the alcohol and by control of the valve 24 and thereby of the proportion of this condensate returned to the column, the proportion of these light volatile congeners or heads returned to the column 11 may also be controlled. If desired, all of the condensate from condenser 19 may be removed to effect removal of substantially all of the heads fractions in the vapors leaving the column 11; or any desired proportion of this condensate may be removed from the system.

In the operation of fractionating column 11, as is well understood in connection with the operation of such columns, the fusel oil constituents present in the liquid supplied to this column through the line 14 are collected or accumulated in an intermediate portion of the tower above the point of admission of the beer or liquid to be distilled. In order to effect their removal from the column, valved lines 25 are provided for the withdrawal of side streams from the column at a plurality of points. These are manifolded to the line 26. Any one or a number of the lines 25 may be used to effect the removal of liquid containing all or most of the fusel oil constituents from the column. The selection of the particular side streams which are removed for this purpose is made in accordance with conventional practice, depending upon the specific conditions of operation of the column. The fusel oil-containing liquid thus removed, which has alcohol content of 40 to 65%, is pumped by pump 27 through line 28 and flow indicator 29 into the lower portion of the fusel oil decanter 30. If desired, a portion of this liquid or alternatively, all of it may be caused to pass through line 31 and flow indicator 32 into manifold 33 from which a number of valved lines 34 entering a third column 35 are provided. By means of one or more of the valved lines 34, the fusel oil-containing liquid may be introduced into a selected point in the intermediate portion of the column 35, which is hereinafter designated as the fusel oil column. The action of this column will be more fully described hereinafter. Lines 28 and 31 are provided with control valves 36 and 37, respectively. As is readily apparent, by operation of the valves 36 and 37, distribution of the fusel oil-containing liquid removed from column 11 may be controlled so that all of it goes to fusel oil decanter 30 or to the fusel oil column 35, or so that any desired part of the fusel oil-containing liquid can be sent to the decanter while the remainder passes to the fusel oil column.

Water is supplied to the fusel oil decanter 30 through the line 38 and in it separation of fusel oil and aqueous liquid takes place. The fusel oil rises to the top of the decanter and is discharged through line 40. The aqueous liquid separated in the fusel oil decanter 30 leaves through the line 41 provided with inverted trap 42 and enters the column 11 at an intermediate point, below the point of admission of the beer or liquid to be distilled. The line 40 for discharge of the separated fusel oil is provided with a valve 43. All of the fusel oil constituents separated in decanter 30 may be eliminated through line 40, if desired. It it is desired to return some proportion of the fusel oil constituents to the column 11, by operation of valve 43, the proportion of fusel oil constituents removed from the system at this point may be limited and controlled.

The fusel oil column 35, which is of the conventional type, is heated at its base by closed or open steam or a combination of both supplied through the line 44.

The fusel oil-containing liquid removed as a side stream from the column 11, or part thereof, entering the column 35 from the manifold 33, is subjected to distillation therein. The temperature at the base of this column may be in the order of 215 to 220° F. As the vapors rise through the column, their alcohol concentration increases. The vapors leave the column at a temperature of about 175 to 180° F. and with an alcoholic content of say about 80 to 95%. These vapors may contain some of the more volatile congeners or heads and also a minor proportion of tails or fusel oil constituents, carried over by steam distillation.

The vapors pass out of the column 35 through line 45 and pass successively through the condensers 46 and 47. These condensers are of the usual type and are cooled by indirect heat exchange with water or with liquid to be distilled, according to the wishes of the operator.

The condensate formed in the condenser 46 passes out through the line 48 provided with a valve 49. The line 48 is also connected by line 50 with the top of the fusel oil column 35. The condensate formed in the condenser 47 passes out through the line 51, provided with valve 52. The line 53 connects the line 51 with the line 48. As is apparent, by operation of the valve 52, any desired proportion of the condensate formed in condenser 47 may be caused to join the condensate from the condenser 46 in the line 48, the remainder of the condensate formed in the condenser 47 being removed from the system. Since the condensate formed in the condenser 47 contains some of the aldehydes, esters and other materials of lower boiling point than the alcohol, including the materials commonly called "heads," it is readily apparent that any desired proportion of these materials present at this point may be removed from the system, the remainder being included in the condensate from condenser 46.

By control of the valve 49, a part of the combined condensate in line 48 is caused to pass through the line 50 into the top of fractionating tower 35 as reflux. The remainder continues through line 48, by which it is discharged into the upper portion of the column 11, at a point above that at which the fusel oil containing liquid is withdrawn from said tower.

The fusel oil constituents of the feed to the fusel oil column 35 largely accumulate in an intermediate portion of the tower where the temperature is in the range from 195 to 200° F. A side stream containing these constituents is drawn off through one or more of the valved lines 55 to manifold 56 and passes through line 57 to pump 58, by which it is forced through line 59 into the fusel oil decanter 60, which is of the type as decanter 30. Water is supplied to the decanter 60 in controlled amounts through line 61. Separation of fusel oil and aqueous liquid takes place in the fusel oil decanter in the usual manner. The fusel oil is drawn off through line 62, which is connected to a line 63 by which the fusel oil is removed from the system. Line 43, carrying off the fusel oil from fusel oil decanter 30, is likewise connected into the line 63. The line 62 is provided with valve 65, by which the withdrawal of fusel oil from the fusel oil decanter 60, and thereby the completeness of separation of fusel oil constituents from aqueous liquid therein, may be controlled.

The aqueous liquid separated in fusel oil decanter 60 is removed through the line 66 provided with an inverted U-trap 67 and passes through line 68 into an intermediate point of the fusel oil column 35, below the point of removal of the side stream containing the fusel oil constituents.

As hereinbefore described, it is apparent that any desired proportions of the lighter and heavier congeners removed from the fractioning column 11 may be continuously returned thereto, the remainder being eliminated. The content of these congeners is one of the important factors controlling the taste, bouquet, flavor and other characteristics of the final distilled product or whisky in carrying out the present invention.

From the upper portion of the column 11, a distillate product side stream is drawn off through one or more of the valved lines 70, from which it is manifolded into line 71 and pumped by pump 72 through line 73, provided with a flow indicator 74, into the manifold 75, from which it is discharged into the upper portion of the fractionating column 10 through one or more of the valve lines 76. The distillate product removed from the upper portion of the column 11 in this way is one having an alcohol content which approaches, and may be higher or lower than the alcohol content desired in the final distillate product of the system. Thus the side stream drawn off from column 11 may have an alcohol proof of say 70 to 192.

The selection of the point or points from which this distillate product is withdrawn from the column 11 is dependent upon the judgment of the operator and is in general determined by him upon the basis of the content of congeners therein as determined by its effect upon the taste and flavor of the final product of the system. The point at which this distillate side stream from column 11 is introduced into column 10 through one or more of the valve lines 76 is dependent primarily upon its alcohol content, since it is desirable that it be introduced at approximately the point in the column where the reflux liquid therein has approximately the same alcohol content as the liquid being introduced.

The column 10 serves as a final product column. In addition to the distillate side stream from column 11, it is supplied with the remainder of original fermented alcoholic liquid of the same character as that fed to column 11. As hereinbefore set forth, this feed stock is supplied to the column 10 at an intermediate point through the line 12. In general the feed of fermented alcoholic liquid supplied to the column through the line 12 is such that it provides a desired proportion, say 10 to 60% of the final product distillate produced in column 10 as hereinafter described. The column 10 is operated in the conventional manner, heat being supplied by closed or open steam or a combination of both, at the base of the column. Steam for this purpose is introduced through the line 80.

The temperature at the base of the column will ordinarily be in the order of 215° to 220° F. The column is operated so that the vapors removed at the top have a concentration substantially in excess of 50%, say 75 to 95%, the temperature at the top of the column being from about 187 to 195° F. Vapors pass out of the top of the column through the line 81 and pass successively through the coolers or condensers 82 and 83. These are also of conventional type and may be cooled by water or by beer in order to preheat the latter before it is introduced into the columns 10 and 11. The condensate from condenser 82 passes out through line 84 and is returned to the top of column 10 as reflux. The condensate formed in condenser 83 passes out through the line 85. The line 85 is connected with the line 84 by a line 86. Beyond the point of connection with this line, line 85 is provided with a valve 87. By control of the valve 87, any desired proportion of the condensate from the condenser 83 may be introduced into the line 84 to join the condensate from condenser 82 and to be returned to the column. The condensate in condenser 83 carries with it the more volatile aldehydes, esters and other congeners or heads. Any desired proportion of these, not returned to the column 10, may be discharged from the system.

Column 10 is operated so that the desired distillate product, which ordinarily has a proof in the range of 80 to 150 or somewhat higher, is collected on the plates at an intermediate portion in the tower, above the point of introduction of the feed stock entering through the line 12. The desired distillate product is drawn off from the column 10 as a side stream through one or more of the valved lines 88 into manifold 89 and passes through cooler 90, which is of conventional character and is cooled by water or other suitable means. The cooled product passes out of the cooler into the line 91, by which it is conducted to suitable storage.

The fractionating columns 10 and 11 and the fusel oil column are provided with residue draw-off lines 95, 96 and 97, respectively.

In operation, the beer from which whisky of desired characteristics is to be produced, is fed in part to each of columns 10 and 11, in general the major portion going to column 11. Thus, in general, from 40 to 75% or more is fed to column 11 and the balance to column 10 when the distilled products desired are whiskies derived from converted starchy grain and other vegetable sources. With other products, as brandies derived from fruit sources, the proportions fed to the two fractionating columns may be the same, or a less amount, say 30 to 40% of the total wine treated may be fed to column 11. It will be understood that the portion of the beer fed to column 11, in its subsequent treatment in that column and in fusel oil column 35 and the auxiliary equipment of those two columns as hereinbefore described, is subjected to a more complete fractionation of its alcohol, heads, tails and fusel oil constituents than is the case with the portion of the beer fed to column 10. All or the major proportion of the congeners may be separated from the alcohol distillate fraction which is removed from the column 11 and transferred through lines 71 and 73 to final product column 10. This distillate may be substantially free of congeners or include a controlled proportion of the heavier and lighter congeners, less than the proportion originally present, to secure the taste, bouquet and other characteristics desired by the operator at this point.

In column 10, in conjunction with the distillation process occurring therein, there is a mixing of the products drawn off from fractionating column 11 through lines 71 and 73 with those derived from the portion of the beer supplied directly to column 10. In the operation of column 10 and its auxiliary equipment, while some proportion of the heads distilled off may be discharged from the system through line 87 if desired, other congeners are permitted to remain in the system except for such proportion of the fusel oil constituents as may be steam-distilled off with the heads and removed through line 87. In general, this will be but a small proportion thereof.

In effect, in the operation of column 10, a mixed feed stock is employed, partly made up of refined distillate product of the fermented liquor or beer used as derived from column 11, and partly made up of the crude fermented liquor or raw beer, containing the full complement of congeners of the alcohol formed in the fermentation. The extent of refinement of the distillate portion of the feed to the column and the proportions of distillate and raw feed may be varied to provide the desired characteristics of body, flavor, bouquet, etc. in the final distillate product. Once the conditions have been set up to produce the desired product characteristics, the operation gives a uniform product having these characteristics in continuous operation.

Thus, as an illustrative example of an operation to produce a bourbon whisky from a beer derived from a conventional bourbon mash, a major proportion of the total feed, say 50 to 60% may be supplied to column 11, the remaining 40 to 50% passing to column 10 through line 12. The beer may suitably be preheated to, say, 175 to 200° F. by flow through the cooling tubes in condensers 18, 46 and 82, or by other suitable means. As the connections for such preheating are conventional, they are not illustrated.

Column 11 is operated to pass off through vapor line 17 a vapor of high alcohol content, say 85 to 96% alcohol. These vapors, which include the lighter congeners or heads with some of fusel oil constituents, pass through condensers 18 and 19. The higher boiling fractions condense in condenser 18 and return to the top of column 11 through line 20. The lower boiling constituents of the vapors, including the greater proportion of the heads, condense in condenser 19. To remove heads, if desired, all or the greater portion of this condensate is eliminated through line 23. According to the characteristics desired by the operator, a proportion of the heads fraction, say from 10% to 100% may be returned to the top of tower 11 with the reflux.

The fusel oil fraction removed from tower 11 through line 26 may be subjected directly to decantation treatment in fusel oil decanter 30 or may be redistilled for more complete separation of its constituents in fusel oil column 35. In the former case, the water soluble portions of the fusel oil fraction are returned through line 41 to column 11 for redistillation as hereinbefore described. In the latter case, alcohol-containing fractions of the fusel oil cut from column 11 are separated in column 35 and are returned to column 11 for redistillation therein. The fusel oil fraction from column 11 may, if desired, be divided, and a part sent to decanter 30 for treatment, the remainder being redistilled in column 35. As is apparent, a less complete separation of fusel oil fractions is effected from the portion of the fusel oil cut from column 11 which is sent directly to decanter 30 than is accomplished in fusel oil column 35 and its associated equipment on the portion of the fusel oil cut supplied to that column. By control of the proportions of the fusel oil cut sent to these two devices and of the return of fusel oil constituents to column 11, the content of fusel oil constituents in the distillate side stream taken off from the column 11 through the line 71 may be controlled. Thus, by sending all of the fusel oil cut from column 11 to fusel oil column 35 and proper operation of the auxiliary equipment, substantially all of the fusel oil constituents of this cut may be removed. With respect to that portion of the fusel oil cut sent to the column 35, a further separation of light congeners or heads remaining in that cut may also be effected, which cannot be done with that portion of the fusel oil cut supplied to the decanter 30. When less complete separation of the constituents of the fusel oil cut is desired, all of it may be sent from column 11 to the decanter 30.

Thus, the distillate side stream removed from the fractionating column 11, which preferably contains from 50 to 75% alcohol, may be substantially entirely freed of both light and heavy congeners, or desired proportions of either of these may be retained in it. By the operation of the column 10, a distillate product is secured as a side stream passing out through manifold 89. This distillate cut will have the alcohol content of the desired final product and may be, say from 80 to 150 proof or sligthly higher, but will contain only the congeners derived from that part of the original feed stock fed to column 10 or if desired, in addition a reduced amount of congeners, either light or heavy or both, derived from that part of the original beer or feed stock fed to the column 11. In this way, a continuous operation may be carried out with the production of a distillate product of controlled characteristics which remains constant throughout the operation.

In Fig. 2 a modified arrangement of apparatus is shown, suitable for carrying out the present invention and somewhat simplified in certain respects.

In the arrangement shown in Fig. 2, the numeral 100 designates a fractionation or distillation column, fitted with fractionating plates of conventional character. The numeral 101 designates a second column provided internally with conventional fractionating plates and operated, in this modification of the invention, essentially as a stripping column.

The beer, wine or other distilling material, which may be preheated to a greater or less extent by heat exchange with vapor products of the system, is conducted from a storage container or other suitable source, through line 102, part passing to column 100 through line 103 and the remainder through line 104 to ultimately reach column 101, as hereinafter described. In general, the proportion of the distilling material passing to column 101 is at least equal to that passing to column 100, and may be as high as 75 to 85% of the total.

The distilling material entering through line 104 passes through condenser 105 in heat exchange with vapors from column 101. The preheated distilling material passes out through line 106 and enters the upper portion of column 101.

As hereinbefore stated, in this embodiment of the invention the column 101 is operated essentially as a stripping column. In its operation an alcoholic vapor of intermediate alcohol content, say 35 to 75%, is removed from the top of column 101 through line 107, the temperature at the top of the column being in the order of 180 to 195° F. Steam (preferably open steam) is introduced into the base of column 101 through line 108 to maintain a suitable temperature of say 205 to 215° F. and to give a steam distillation effect that will assure the heavier congeners, including fusel oil fractions, passing off in the vapors in the column with the alcohol vapors and associated esters, aldehydes and other light congeners or head fractions. For suitable conditions of operation it is found desirable to maintain a molar ratio of descending liquid to rising vapors in the column of at least 3 to 1 and preferably of 4 to 1, or more.

The vapors passing out of the column 101 through line 107 are partially condensed in condenser 105, the condensate passing out through line 109. The uncondensed vapors pass from condenser 105 through line 110 into condenser 111 and are condensed, passing out through line 112. The line 112 is connected by a line 113 to line 109 from condenser 105, the combined condensates through line 114 to a vessel or decanter 115.

The condensate from condenser 111 includes some light congeners or heads, and if desired, some or all of these may be removed through valve 116. By operation of valve 116, all or part of the condensate passing out of condenser 111 through line 112 may be caused to pass into the vessel or decanter 115 with the condensate from condenser 105.

The combined condensates are collected in vessel or decanter 115. If the proportion of fusel oil constituents is sufficiently large, say about 70% or higher, separation into two phases will take place in vessel 115. If the proportion of fusel oil constituents is appreciably lower, such separation will not take place.

The vessel 115 is provided with an overhead draw-off line 117 having a control valve 118, and also with a bottom draw-off line 119 having a control valve 120. Vessel 115 is also provided at an intermediate point with a line 121 leading into column 101 near the top.

As is apparent, heads, tails and fusel oil fractions distilled off from the feed to column 101 are collected with the condensate in vessel 115. When separation into two phases takes place therein, fusel oil and tail fractions may be removed through line 117, the removal being either complete or partial as controlled by valve 118. When separation does not take place in vessel 115, any desired proportion of the congeners, including both heads and tails fractions, may be removed through line 119 and control valve 120. In both cases, the remaining condensate in vessel 115 passes through line 121 into column 101 as reflux. As the operation of column 101 and its associated parts is continuous, once the desired set of conditions has been established so that the proportions of congeners derived from that portion of the distilling material fed to column 101 and returned thereto gives the desired balance of flavor, bouquet and body in the final product of the system, these conditions are maintained thereafter so long as the same product characteristics are desired.

The bottoms from column 101, which may contain 6 to 12% alcohol, and are denuded of congeners to the extent desired, as hereinbefore described, are withdrawn through line 125 by pump 126 and forced through line 127 into line 103, where they join the remaining portion of the distilling material fed to the system and enter the distilling column 100 at an intermediate point.

The column 100 may be a conventional distillation column. In the form illustrated it is of the type in which the desired product is removed as a side stream, as will be more fully explained hereinafter.

The combined feed for column 100 enters through line 103 at an intermediate point below the product draw-off lines. The column is heated by steam introduced at the base of the column through line 128. Closed or open steam or a mixture of both may be used. The temperature at the base of the column may be maintained in the order of 228 to 230° F. Fractionation takes place in the column and vapors leave the top of the column through line 129 at a temperature of, say, 170 to 180° F. at a proof of 188 to 192.

The vapors pass successively through condensers 130 and 131, in which they may be cooled in the conventional manner, by heat exchange with entering distilling material, for example. Condensate formed in condenser 130 passes out through line 132 and is returned to the top of column 100 as reflux. Condensate from condenser 131 passes out through line 133 and part or all of it passes through line 134 to join the condensate from condenser 130 in line 132 and enter the column as reflux. A control valve 135 in line 133 permits the withdrawal of any desired proportion of the condensate from condenser 131 and with it, some proportion of the heads fractions removed from the distilling material fed to the column.

Valved draw-off lines 136 lead from a number of successive fractionating plates in the column to a manifold line 137. The desired distillate product may be withdrawn as a side stream from a selected plate or group of plates and conducted through line 137 to a conventional cooler 138, the cooled product being discharged through line 139 provided with valve 140. This product may have a proof of say 80 to 160, preferably in the proof range of commercial products of the same type.

As will be apparent from the foregoing description, as in the embodiment of the invention shown in Fig. 1, by controlling the relative proportions of the original distilling material supplied to columns 100 and 101, and by controlling the extent of the removal of congeners from that portion of the distilling material fed to column 101, the desired characteristics of body, flavor and bouquet may be secured continuously in the final product.

The following example is illustrative of the operation of the apparatus diagrammatically illustrated in Fig. 2. The desired product in this instance is a brandy.

The distilling material is a wine containing 4 to 6% alcohol by volume. 80% of the total wine is fed directly to column 101. It is operated to effect substantially complete removal of congeners by supplying steam in sufficient amounts through line 108, a temperaure of 205 to 215° F. being maintained at the base of the column. With a feed to column 101 of 4800 wine gallons per hour, a supply of steam amounting to 10,000 pounds per hour has been found satisfactory.

Vapors having an alcohol content by volume of 35 to 75% and at a temperature of 185° to 195° F. pass out of column 101 through line 107 and pass through the condensing system as hereinbefore described. When separation in vessel 115 is desired, the fusel oil strength should be in the order of 60 to 75% by volume. In the present example, substantially all congeners carried off in the vapors from column 101 are removed from the system except the small amount that may be dissolved in the aqueous alcoholic liquid returned to the column 101 through line 121.

The bottoms from column 101, which may contain 3 to 6 volume percent of alcohol, are fed through line 103 to the column 100 with the remaining 20% of the wine (about 1200 wine gallons per hour). Column 100 is operated in the usual manner, with substantially no removal of congeners, the entire condensate from the vapors leaving the column through line 129 being returned as reflux. A brandy distillate of the desired proof, say 120 to 168, is taken off as a side stream through manifold 137. Operating as above described, the brandy product will contain only about one-fifth of the normal congener content of a brandy of the same proof distilled from the total amount of wine fed to the system. However, the balance of congeners will be that normal for a brandy distilled from the same stock. The brandy produced will be, however, of a lighter body. By varying the proportions wine fed to the columns 100 and 101 respectively, the content of congeners in the product and hence the body may be varied.

In the foregoing description of the modification of Fig. 2, the product column 100 has been described as of the conventional type in which the distillate product is taken off as a side stream, as in standard brandy and rum stills. However, a conventional column of the whisky still type may be used, in which the desired product is removed as an overhead product. In such a still, the side stream draw-off line 136 would not be used, or preferably would not be present, and the distillate products from the condensers 130 and 131 would be removed through line 132 by operation of control valve. The column would be operated in such case with a top temperature such as to give a product of the desired proof; say a top temperature of from 180 to 208° F. to give a product having a proof of 84 to 160.

Although the invention has been described in connection with specific embodiments thereof, it will be understood that these are not to be regarded as limitations upon the scope of the invention except insofar as included in the accompanying claims.

I claim:

1. The method of continuously producing whiskies of desired characteristics of taste, bouquet and body and of uniform quality in distillation apparatus which comprises supplying a part of the beer to be distilled to a first fractionating column while supplying heat to said fractionating column thereby vaporizing alcohol and congeners, supplying the remainder of said beer feed to a second fractionating column while supplying heat to said second fractionating column, thereby vaporizing alcohol and light congeners from the fusel oil constituents, conducting the vapors from said second column to a condenser to produce a condensate of said alcohol and light congeners, discharging a portion of such condensate containing light congeners and returning the remainder of the light congeners plus condensed alcohol to said second fractionating column as reflux, removing from said second fractionating column a liquid side stream containing fusel oil constituents, separating fusel oil from said side stream and returning the remaining constituents of said side stream to said second fractionating column for redistillation therein, removing spent beer from the bottom of said second fractionating column, removing from said second fractionating column at a point intermediate the fusel oil side stream draw-off and the point of return of reflux a liquid of high alcoholic content, feeding said liquid of high alcoholic content from said second fractionating column to said first fractionating column at a point intermediate the beer feed inlet and the head of said first fractionating column, condensing vapors of alcohol and lower boiling congeners distilled from said first fractionating column, refluxing the condensate to the head of said first fractionating column, removing from the first fractionating column at a point lower in the column than the reflux return but above the point of beer feed, a liquid side stream of desired characteristics as a whiskey and removing spent beer from the lower portion of said first fractionating column.

2. The method of continuously producing whiskies of desired characteristics of taste, bouquet and body and of uniform quality in distillation apparatus which comprises supplying a part of the beer to be distilled to a first fractionating column while supplying heat to said fractionating column thereby vaporizing alcohol and congeners, supplying the remainder of said beer to a second fractionating column while supplying heat to said second fractionating column thereby vaporizing alcohol and light congeners from the fusel oil constituents, conducting the vapors from said second fractionating column to a succession of condensers to produce a condensate of said alcohol substantially free of light congeners and a condensate containing said light congeners, discharging a portion of the condensate containing light congeners and returning the remainder of said condensate together with the alcohol condensate to the head of said second fractionating column as reflux, removing from an intermediate point in said second fractionating column a side stream containing fusel oil constituents, separating the fusel oil from said side stream and returning the constituents of said side stream other than the separated fusel oil to said second fractionating column for distillation therein, removing spent beer from the bottom of said second fractionating column, removing from said second fractionating column at a point intermeidate the fusel oil draw-off and the point of return of reflux a liquid of high alcohol content, feeding said liquid of high alcohol content to said first fractionating column at a point intermediate the beer feed inlet and the head of said first fractionating column, condensing vapors of alcohol and lower boiling congeners from the distillation of beer in said first fractionating column, refluxing the condensed vapors of alcohol and lower boiling congeners to the head of said first fractionating column, removing from the first fractionating column at a point above the beer feed thereto a liquid side stream of desired characteristics as a whisky product and removing spent beer from the lower portion of said first fractionating column.

3. The method of continuously producing whiskies of desired characteristics of taste, bouquet and body and of uniform quality in distillation apparatus which comprises supplying a part of the beer to be distilled to a first fractionating column while supplying heat to said fractionating column thereby vaporizing alcohol and congeners, supplying the remainder of said beer feed to a second fractionating column while supplying heat to said second fractionating column, thereby vaporizing alcohol and light congeners from the fusel oil constituents, conducting the vapors from said second column to a condenser to produce a condensate of said alcohol and light congeners, discharging a portion of such condensate containing light congeners and returning the remainder of the light congeners plus condensed alcohol to said second fractionating column as reflux, removing from said second fractionating column a liquid side stream containing fusel oil constituents, separating fusel oil from said side stream and returning the remaining constituents of said side stream to said second fractionating column at a point below the side stream draw-off, removing from said second fractionating column at a point intermediate the fusel oil side stream draw-off and the point of return of reflux a liquid of high alcoholic content, feeding said liquid of high alcoholic content from said second fractionating column to said first fractionating column at a point intermediate the beer feed inlet and the head of said first fractionating column, condensing vapors of alcohol and lower boiling congeners distilled from said first fractionating column, refluxing the condensate of the vapors of alcohol and lower boiling congeners to the head of said first fractionating column, removing from the first fractionating column at a point lower in the column than the reflux return but above the point of beer feed, a liquid side stream of desired characteristics as a whisky product and removing spent beer from the lower portion of said first fractionating column.

4. The method of continuously producing whiskies of desired taste, bouquet and body and of uniform quality in distillation equipment which comprises dividing the beer to be distilled into two portions, feeding one portion to a first fractionating column while supplying heat to said column thereby vaporizing alcohol and congeners, feeding the second portion to a second column while supplying heat to said second column thereby volatilizing alcohol and congeners including the fusel oil constituents, condensing the vapors of alcohol and congeners and fusel oil, returning the condensed alcohol substantially free of congeners to the head of said second fractionating column as reflux, removing from a point lower down in said second fractionating column than the return point for reflux a liquid alcoholic fraction, combining said alcoholic fraction with that portion of the beer being fed to said first fractionating column, condensing the vapors of alcohol and congeners from said first fractionating column, returning the condensed alcohol and a controlled portion of the condensed congeners to said first fractionating column as reflux, removing from the lower portion of said first column a spent beer and removing a liquid product intermediate the spent beer removal point and reflux return, an alcoholic distillate product having an alcohol content corresponding substantially to the alcohol content of the total amount of beer fed to both columns and a congener content less than the congener content of said total amount of beer.

5. The method as set forth in claim 4 wherein the vapors of alcohol and congeners from said second column are condensed in a manner effecting substantially complete separation of congeners from the condensed alcoholic portion of said vapors and said condensed alcoholic portion of said vapors is returned to said second column as reflux, and the alcoholic distillate product removed from the said first fractionating column has a light congener content consisting substantially only of the light congeners derived from the beer fed to said first fractionating column.

6. The method as set forth in claim 4 wherein said second column is heated to vaporize alcohol and congeners including the fusel oil constituents, alcohol vapors are separately condensed and returned to said second fractionating column as reflux, the beer stripped of congeners and containing substantially the same alcoholic content as when feed to the column is removed from the bottom of said second fractionating column and introduced into said first fractionating column for distillation therein.

7. The method of continuously producing whiskies of desired characteristics of taste, bouquet and body and of uniform quality in distillation apparatus which comprises supplying part of the beer to be distilled to a first fractionating column while supplying heat to said column, supplying the remainder of the beer feed to a second fractionating column while supplying heat to said second fractionating column, distilling the beer in said second fractionating column, removing light congeners and heavy congeners including fusel oil constituents from the distilling alcoholic liquid in said second column, returning a portion of said light congeners in condensed liquid form to said second fractionating column, removing an alcoholic liquid stripped of fusel oil constituents and substantial portions of light congeners from said second column, feeding said alcoholic liquid to the first column for distillation therein, distilling the combination of beer and stripped liquid in said first fractionating column to produce vapors of alcohol and congeners, condensing the vapors and returning the alcohol condensate and desired proportions of light congener condensate to the head of said first fractionating column as reflux, removing spent beer from the lower portion of said first fractionating column and removing from the first fractionating column at a point intermediate the reflux inlet and the beer feed inlet a liquid distillate product of desired characteristics as a whisky product.

8. The method of continuously producing whiskies of desired characteristics of taste, bouquet and body and of uniform quality in distillation apparatus which comprises supplying a part of the beer to be distilled to a first fractionating column while supplying heat to said fractionating column thereby vaporizing alcohol and congeners, supplying the remainder of said beer feed to a second fractionating column while supplying heat to said second fractionating column, thereby vaporizing alcohol and light congeners from the fusel oil constituents, conducting the vapors from said second column to a condenser to produce a condensate of said alcohol and light congeners, discharging a portion of such condensate containing light congeners and returning the remainder of the light congeners plus condensed alcohol to said second fractionating column as reflux, removing from said second fractionating column a liquid side stream containing fusel oil constituents, separating fusel oil from said side stream and returning the remaining constituents of said side stream to said second fractionating column, feeding said stream of fusel oil constituents to a third distillation column, supplying heat to said third distillation column thereby vaporizing alcohol and light congeners from the fusel oil constituents, removing from said third distillation column a liquid side stream containing fusel oil constituents, condensing vaporized alcohol and light congeners, dividing the condensate into a first portion and a second portion, refluxing the first condensate portion to the head of said third fractionating column, feeding the second condensate portion to said second fractionating column, removing from said second fractionating column at a point intermediate the fusel oil side stream draw-off and the point of return of reflux a liquid of high alcoholic content, feeding said liquid of high alcoholic content from said second fractionating column to said first fractionating column for distillation therein at a point intermediate the beer feed inlet and the head of said first fractionating column, condensing vapors of alcohol and lower boiling congeners distilled from said first fractionating column, refluxing the condensate to the head of said first fractionating column and removing from the first fractionating column at a point lower in the column than the reflux return but above the point of beer feed, a liquid side stream of desired characteristics as a whisky product and removing spent beer from the lower portion of said first fractionating column.

9. The method of continuously producing whiskies of desired characteristics of taste, bouquet and body and of uniform quality in distillation apparatus which comprises supplying a part of the beer to be distilled to a first fractionating column while supplying heat to said fractionating column thereby vaporizing alcohol and congeners, supplying the remainder of said beer feed to a second fractionating column while supplying heat to said second fractionating column, thereby vaporizing alcohol and light congeners from the fusel oil constituents, conducting the vapors from said second column to a condenser to produce a condensate of said alcohol and light congeners, discharging a portion of such condensate containing light congeners and returning the remainder of the light congeners plus condensed alcohol to said second fractionating column at reflux, removing from said second fractionating column a liquid side stream containing fusel oil constituents, separating fusel oil from said side stream and returning the remaining constituents of said side stream to said second fractionating column for redistillation therein, removing from said second fractionating column at a point intermediate the fusel oil side stream draw-off and the point of return of reflux a liquid of about 50% to about 75% alcoholic content, feeding said liquid of high alcoholic content from said second fractionating column to said first fractionating column for redistillation therein at a point intermediate the beer feed inlet and the head of said first fractionating column, condensing vapors of alcohol and lower boiling congeners distilled from said first fractionating column, refluxing the condensate to the head of said first fractionating column, removing from the first fractionating column at a point lower in the column than the reflux return but above the point of beer feed, a liquid side stream of about 70% to about 95% alcohol as a whisky and removing spent beer from the lower portion of said first fractionating column.

References Cited in the file of this patent

UNITED STATES PATENTS 2,602,744     Neureuther _____ July 8, 1952